June 7, 1932.   F. W. MEYER   1,862,233
DYNAMO ELECTRIC MACHINE REGULATING SYSTEM
Filed April 8, 1918   3 Sheets-Sheet 1

Inventor
Friedrich Wilhelm Meyer
by Edwin B. H. Tower, Jr.
Atty.

June 7, 1932.   F. W. MEYER   1,862,233
DYNAMO ELECTRIC MACHINE REGULATING SYSTEM
Filed April 8, 1918   3 Sheets-Sheet 3
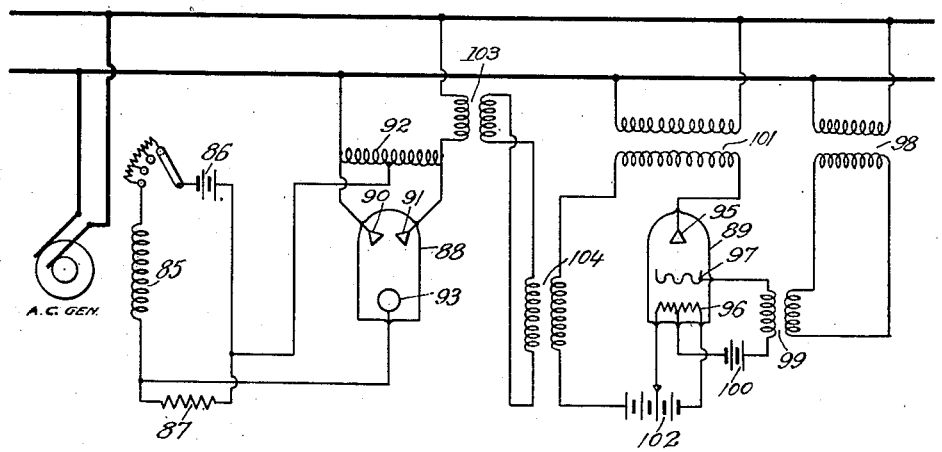
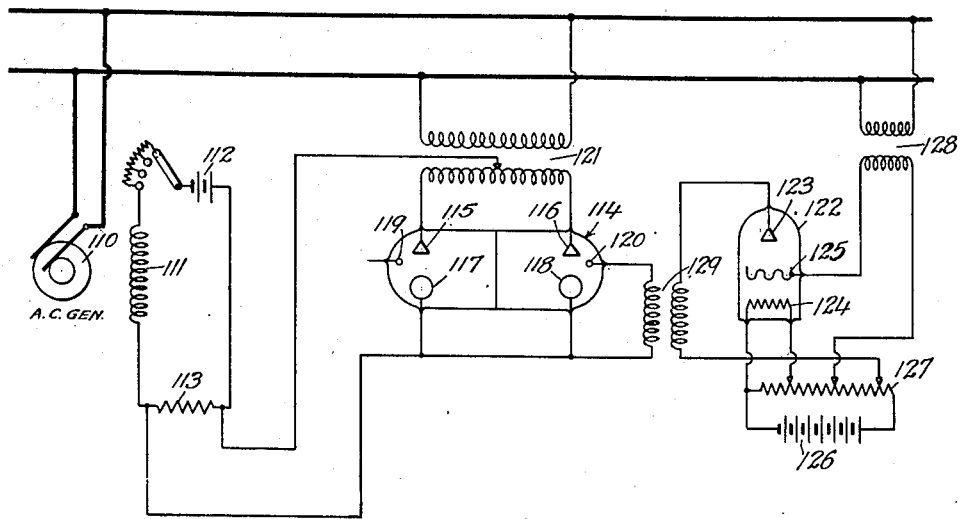

Patented June 7, 1932

1,862,233

UNITED STATES PATENT OFFICE

FRIEDRICH WILHELM MEYER, OF MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

DYNAMO ELECTRIC MACHINE REGULATING SYSTEM

Application filed April 8, 1918. Serial No. 227,337.

This invention relates to a dynamo electric machine regulating system.

The dynamo electric machine regulating system ordinarily employed in practice has an electromagnetic mechanism which controls a resistance.

The electromagnetic mechanism introduces a lag in the regulation and the resistance dissipates electrical energy.

The object of the present invention is to provide a regulating system in which the regulation is varied in substantial coincidence and accordance with variations in the condition to be regulated.

Another object is to provide a regulating system in which close regulation is obtained.

Another object is to provide a regulating system in which electromagnetic mechanism and resistance controlled thereby is eliminated.

Another object is to provide a simple, economical and efficient regulating system.

In accordance with this invention, the dynamo electric machine has its field regulated by an electronic valve arranged in its field circuit and controlled by means to vary its action in substantial coincidence and accordance with the condition to be regulated.

The electronic valve may have different forms and characteristics and it may be controlled in different ways.

The invention will be further set forth as employed in a generator regulating system, but of course it may be applied to regulate other dynamo electric machines.

The accompanying drawings illustrate generator regulating systems which employ the invention, and the views therein are as follows:

Fig. 6 illustrates a system in which an alternating current generator is regulated by an arc valve which is controlled by a heated cathode valve.

Fig. 7 illustrates another system in which an alternating current generator is regulated by an arc valve which is controlled by a heated cathode valve.

Figure 1:
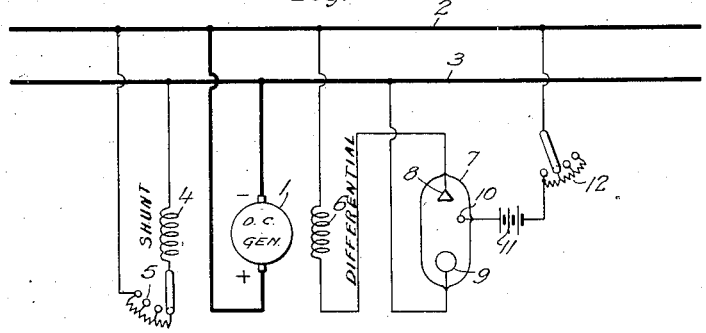
Fig. 1 illustrates a regulating system in which a direct current generator is regulated by an arc valve.

Fig. 1 will first be described.

A direct current generator having an armature 1 is shown supplying current to a supply line 2—3. The generator is provided with a shunt field winding 4, the exciting current therethrough being controlled by rheostat 5. This rheostat serves, in the usual manner, as a ready means for adjusting the voltage of the generator to the desired amount.

The generator is also provided with an auxiliary field winding 6, which is arranged to oppose or is differential to the shunt winding 4. The excitation and consequently the voltage delivered by the generator is regulated by varying the current flowing through the auxiliary field winding 6. This current is varied by means of an electroionic valve 7, which is illustrated as of the arc discharge type. The operation and characteristics of the electroionic valves illustrated in this and the following figures are explained in my co-pending application, Ser. No. 142,243, filed January 13, 1917, patented September 21, 1920, Patent Number 1,353,815.

Device 7 has an anode 8, a cathode 9, which is usually of mercury or other metal as for example tungsten, and an auxiliary electrode 10. Cathode 9 is connected to one of the supply lines, and auxiliary anode 10 is connected to the other line through a source of direct current 11 and a rheostat 12. Source 11 is so connected that its voltage opposes and is normally less than the line voltage.

Some degree of regulation may be obtained because of the falling characteristic of the arc discharge between anode 8 and cathode 9. Thus, if the voltage of the line increases the current through the valve increases and the voltage drop therein decreases. More current therefore flows through the opposing auxiliary field 6, and the generator voltage is reduced. Such regulation however is small in amount and tardy of application, particularly because of the self-induction of the auxiliary field winding.

The auxiliary anode however provides for a more rapid and magnified regulative effect. The difference in voltage between source 11 and the line may be adjusted to a very small amount, and this difference of potential is impressed between the auxiliary anode 10 and cathode 9. Changes in the line voltage therefore simultaneously or coincidently cause great changes in the small difference of potential between source 11 and the line, and consequently cause great changes in the voltages impressed between auxiliary anode 10 and cathode 9. These great changes in voltage effect material changes in the discharge between the auxiliary anode and the cathode and a correspondingly great change in the drop and flow of current between main anode 8 and cathode 9 and the flow of current in the opposing field winding 6. The increased flow of current in the field winding 6 takes place substantially simultaneously with changes in line voltage. Thus the excitation of the machine is controlled simultaneously or coincidentally with changes in operating conditions of the machine.

If the line voltage drops the difference in potential between the line and source 11 decreases, the voltage between auxiliary anode 10 and cathode 9 decreases and the drop between main anode 8 and cathode 9 materially increases. Less current therefore flows through the differential field winding 6 and the voltage of the generator increases. A rise in line voltage results in the opposite effect.

Figure 2:
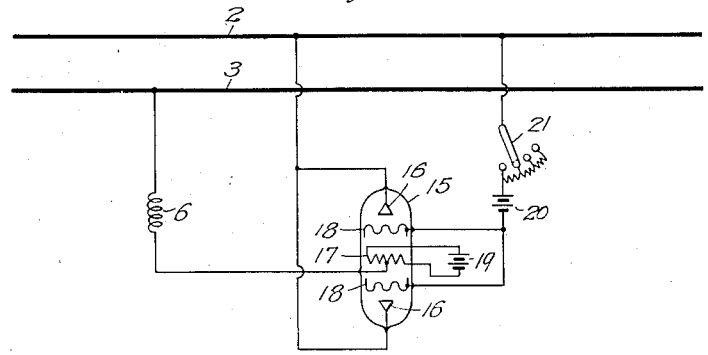
Fig. 2 illustrates a similar system in which a direct current generator is regulated by a heated cathode valve.

Fig. 2 shows an arrangement wherein an electroionic valve of the duplex, dark or luminous low pressure discharge type is substituted for the arc discharge valve of Fig. 1. The current in the opposing auxiliary field winding 6 is controlled by an electroionic valve 15. Device 15 has a pair of anodes 16, a cathode 17 and a pair of auxiliary anodes 18 which may take the form of grids. Cathode 17 is heated by current from a suitable source 19. The auxiliary field winding 6 is connected between line 3 and the middle of cathode 17. Anodes 16 are connected in parallel to line 2. The auxiliary anodes are connected in parallel to line 2 in series with a suitable battery 20 through a rheostat 21. The voltage of battery 20 opposes that of the line.

If the line voltage increases the supplemental voltages between auxiliary anodes 18 and cathode 17 increase and the discharges between main anodes 16 and cathode 17 increase. Because of the high relay ratio in valve 15 much more current, therefore, flows through the opposing field winding 6 and the voltage of the generator is reduced. If the voltage of the generator decreases device 15 operates in the reverse manner, less current flows through the opposing field winding 6, and the generator voltage is increased.

Figure 3:
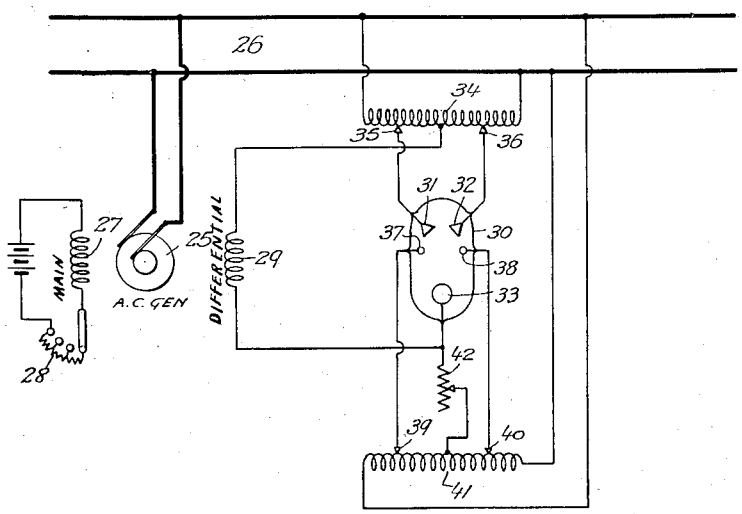
Fig. 3 illustrates a system in which an alternating current generator is regulated by an arc valve.

Fig. 3 shows a single phase generator having an armature 25, supplying current to a single phase line 26. The generator has a suitably excited field winding 27, which may be controlled by a rheostat 28. The generator also has an auxiliary differential field 29, the excitation of which regulates the generator voltage.

The auxiliary field winding 29 receives rectified current from the line by means of a combined regulating and rectifying electroionic valve 30. Device 30 has two main anodes 31 and 32, and a cathode 33, which may be mercury. Connected across line 36 is an auto-transformer winding 34, the middle point of which is connected to one terminal of field winding 29. The anodes 31 and 32 are respectively connected to winding 34 through adjustable taps 35 and 36. By means of these taps the voltage impressed on the device 30 may be varied as desired. Device 30 is also provided with a pair of auxiliary electrodes 37 and 38. These electrodes are connected respectively by adjustable taps 39 and 40 of an auto-transformer winding 41, which is connected across the line 26. The middle of winding 41 is connected to cathode 33 and one terminal of differential field winding 29, through an adjustable resistance 42.

During one half cycle of the line current exciting current for winding 29 passes from one line conductor through tap 35, anode 31, cathode 33, winding 29 and the right hand half of winding 34 to the other line conductor. During the following half cycle current flows through tap 36, anode 32, cathode 33, winding 29, and the left hand half of winding 34 to the other line conductor.

As in the case of the arrangement previously described, some degree of regulation is provided by the characteristics of the discharge between anodes 31 and 32 and cathode 33. In order to give a more rapid and magnified effect the auxiliary anodes 37 and 38 are employed. Between these auxiliary anodes and cathode 33 voltages are impressed from the line through winding 41 in the same manner as just described for anodes 31 and 32 and cathode 33. During each half cycle therefore current is simultaneously flowing between a main anode 31 or 32 and cathode 33, and an auxiliary anode 37 or 38 and cathode 33. The potential drop between the main anodes and the cathodes is materially altered by changes in the drop between the corresponding auxiliary anode and the cathode.

If the line voltage decreases the voltage between auxiliary anodes 37 and 38 and cathode 33 decreases. These decreases in voltage materially increase the potential drops between main anodes 31 and 32 and cathode 33 on account of the current changes and corresponding characteristics. The current through the differential field winding 29 is correspondingly decreased and the voltage of the generator is increased. An increase in line voltage produces the opposite result.

Figure 4:
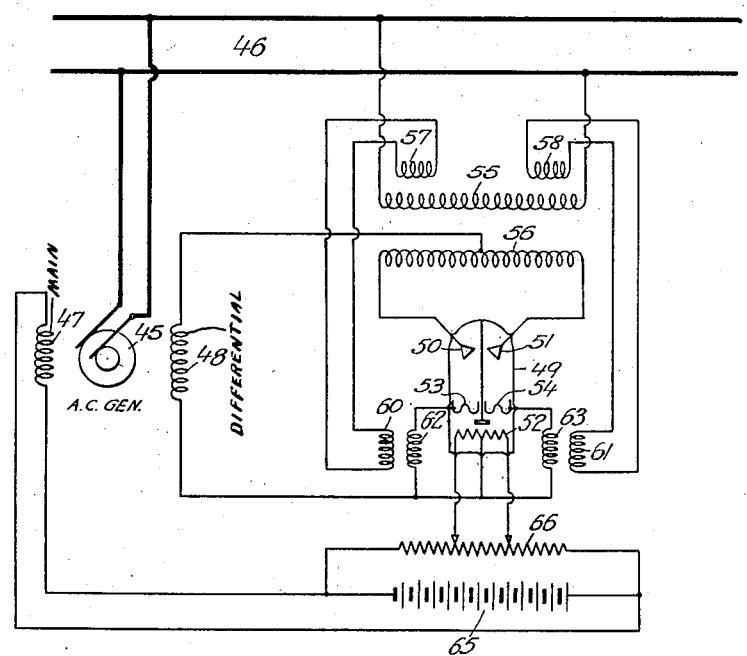
Fig. 4 illustrates a system in which an alternating current generator is regulated by a heated cathode valve.

Fig. 4 shows a single phase generator having an armature 45 supplying current to a line 46, a main field winding 47, and a differential auxiliary field winding 48. The voltage delivered by the generator is varied by varying the exciting current flowing in the auxiliary field winding 48.

The current in the auxiliary field winding 48 is obtained from the alternating current line and is varied through the agency of an electroionic valve 49. Device 49 is of the dark discharge type and is provided with a pair of main anodes 50 and 51 and a cathode 52. It is also provided with a pair of auxiliary anodes 53 and 54 which may take the form of grids.

Connected across supply line 46 is the primary winding 55 of a transformer which is provided with three secondary windings 56, 57 and 58. The auxiliary field winding 48 is connected to the middle of secondary winding 56, and the middle of cathode 52. Secondary windings 57 and 58 are in circuit with primary windings 60 and 61, respectively, of transformers provided with secondary windings 62 and 63. Secondary winding 62 is connected between grid 53 and the middle of cathode 52, and secondary winding 63 is connected between grid 54 and the middle of cathode 52.

The main field winding 47 of the generator is excited by current from a battery 65, which through the agency of an adjustable shunting resistance 66 also supplies heating current for the cathode 52. It will of course be understood that any other suitable source of direct current may be used to excite the main field winding 47, and that a separate source of any desired character may be used to furnish the heating current for the cathode.

During one-half cycle of the line current, exciting current is supplied to the auxiliary differential field winding 48 through anode 50 and cathode 52 and during the succeeding half cycle by current induced from the line through anode 51 and cathode 52.

The drop in potential between the main anodes and the cathode of device 49, and consequently the main exciting current flowing through the differential field winding 48 is controlled by the variations in the potential between the auxiliary anodes 53 and 54 and cathode 52. These supplemental voltages depend upon the value of the voltage in the line because of the action of the transformer windings 55, 57, 60, 62 and 55, 58, 61 and 63.

If the voltage of the line should increase the induced voltages impressed between anodes 50 and 51 and cathode 52 through winding 56 is increased. This increase has little effect however. The auxiliary voltages between auxiliary anodes 53 and 54 and cathode 52 are also increased, producing an enormous decrease in the drop of voltage between the main anodes and cathodes. This produces a very large increase in current in the circuit through the differential field winding 48. The opposing effect of field winding 48 is therefore increased and the voltage of the generator is decreased. A decrease in the line voltage produces the opposite effect, device 49 producing a marked decrease in the current flowing through the differential field winding 48, with a resulting increase in voltage of the generator.

Figure 5:
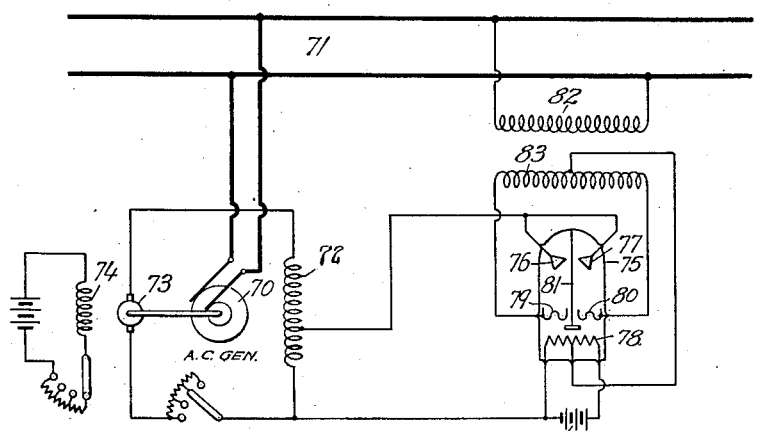
Fig. 5 illustrates another system in which an alternating current generator is regulated by a heated cathode valve.

Fig. 5 shows a single phase alternating current generator having an armature 70, supplying current to a single phase line 71 and having an exciting field winding 72. The exciting current for winding 72 is produced by a direct current exciter having an armature 73, connected to the armature of the generator. The exciter is shown provided with an adjustable, separately excited field 74.

The excitation of the generator is controlled by varying the current through a portion of the field winding 72 by means of an electroionic valve 75. Device 75 is shown as of the dark discharge type having a high vacuum or a gas, such as argon, at low pressure or a vapor such as mercury vapor. It has a pair of anodes 76 and 77 and a cathode 78. The device is also provided with a pair of auxiliary anodes 79 and 80, which may take the form of grids, and the discharge paths are shown separated by a suitable partition 81.

Connected across line 71 is a transformer having a primary winding 82, and a secondary winding 83. The middle point of secondary winding 83 is connected to the middle of cathode 78 and the two outside terminals of winding 83 are connected respectively to auxiliary anodes 79 and 80. The main anodes 76 and 77 of device 75 are connected to some suitable point in field winding 72 and heating current is supplied to cathode 78 by suitable source of energy 84.

By the arrangement just described a portion of the generator field winding 72 is shunted by a circuit which passes through the main anodes 76 and 77 and cathode 78 and it will be apparent that the amount of excitation for the generator will depend upon the amount of current flowing through this shunt circuit. The current in the shunt circuit is varied by changing the potential impressed between auxiliary anodes 79 and 80 and cathode 78, and these voltages depend upon the voltage of the line. An increase in line voltage increases the potential between auxiliary anodes 79 and 80 and cathode 78, and increases the discharge between main anodes 76 and 77 and cathode 78. More current thereupon flows through the shunt of the portion of the field winding 72 and the excitation and consequently the voltage of the generator is decreased. A decrease in line voltage decreases the potential between auxiliary anodes 79 and 80 and cathode 78, decreasing the amount of current flowing through the shunt and increasing the excitation of the generator. The voltage of the generator is consequently increased.

Instead of shunting a portion of the generator field winding by a circuit through an electroionic valve whose condition is controlled by the line voltage, a portion of the field of the exciter may be shunted, with similar results.

Fig. 6 shows an alternating current generator having a field winding 85, which is energized by current from a suitable source 86, passing through a non-inductive resistance 87. The amount of exciting current is varied by varying the potential drop across resistance 87 by means of an electroionic valve 88. The action of valve 88 is controlled by an electroionic valve or relay 89, whose action is controlled by the line voltage.

Valve 88 has a pair of anodes 90 and 91 connected to the terminals of an auto-transformer winding 92 which is connected across the line supplied by the generator. It also has a cathode 93 which is preferably composed of mercury. The middle of winding 92 and cathode 93 are connected across resistance 87. Resistance 87 is therefore simultaneously traversed by current from the exciting source 86 and rectified unidirectional pulsations through valve 88. Changes in the pulsating current through valve 88 changes the potential drop across resistance 87 and consequently changes the exciting current flowing through field winding 85.

Changes in line voltage produce some direct changes in the exciting current because of the characteristics of the discharges in valve 88, as previously described, but these changes are greatly magnified by the action of relay 89. Relay 89 has an anode 95, a cathode 96 and an auxiliary anode 97, which may take the form of a grid.

The supplementary voltage between auxiliary anode 97 and cathode 96 of device 89 is controlled by the line voltage through transformers 98 and 99 and a battery 100. Impulses from the line are also impressed between the main anode 95 and cathode 96 of valve 89 through a transformer 101 and these voltages are superimposed upon the voltage of a battery 102. Changes in the discharge in valve 89 control the discharges in valve 88 through a pair of transformers 103 and 104.

A rise in line voltage causes a change in the voltage impressed between auxiliary anode 97 and cathode 96 of valve 89 which produces a greatly magnified change in the consumption of voltage in valve 89. The magnified changes in valve 89 produce magnified changes in the discharge of valve 88 which cause the voltage drop in resistance 87 to increase. The exciting current through field winding 85 is thereupon diminished and the generator voltage falls. A decrease in line voltage brings about a diminished drop in resistance 87, a corresponding increase in exciting current and the generator voltage rises.

In the figure apparatus is shown for influencing only half of the pulses through valve 88. If it is desired that all of the pulses be affected and all of the line pulses exert an influence on the regulation, a relay and connections similar to those just described may be associated with anode 90.

Fig. 7 shows a single phase generator 110 having a field 111 whose exciting current is supplied by a suitable direct current source 112 and regulated by the drop in potential across a resistance 113 as in the case of the arrangement shown in Fig. 6. The voltage drop across resistance 113 is controlled by an electroionic valve 114 which is shown as of the duplex arc discharge type. Valve 114 has two main anodes 115 and 116, corresponding cathodes 117 and 118 and co-operating ignition anodes 119 and 120. The two sets of electrodes are separated by a partition and co-operating with a transformer 121 connected across the line each rectifies a half wave of the line current. This rectified current passes through resistance 113 and controls the potential drop therein.

Each set of electrodes in device 114 is controlled by an electroionic valve or relay influencing the voltages between the ignition anodes 119 and 120 and the cathodes. Since these relays are alike and function in the same manner only one, viz, that associated with ignition anode 120 is shown. Relay 122 has an anode 123, a cathode 124 and an auxiliary anode 125 which may take the form of a grid. A battery 126 and a resistance 127 provide direct currents of the desired potentials for heating cathode 124, and providing the required voltages between anode 123 and cathode 124, and auxiliary anode 125 and cathode 124. Through a transformer 128 connected across the line a pulsating voltage is impressed between auxiliary anode 125 and cathode 124 and by proportioning the transformer ratio and the voltage provided by battery 126 and resistance 127 slight changes in line voltage may produce comparatively great changes in the auxiliary voltages in relay 122. The main discharge in relay 122 is thereby greatly varied and these variations through a transformer 129 control the time of each ignition and the character of the arc discharges between the right hand set of electrodes in device 114. Thus slight changes in line voltages bring about greatly magnified changes in the generator excitation.

If the line voltages increase the voltage induced through transformer 128 and superimposed upon the opposing voltage produced by battery 126 and resistance 127 between the auxiliary anode 125 and cathode 124 of valve or relay 122 increases. The discharge in relay 122 increases and a greater potential is imposed between auxiliary anode 120 and cathode 118 of valve 114. The time of ignition between main anode 116 and cathode 118 of valve 114 is thereupon advanced and the character of the device therebetween is varied so that more current flows through, and consequently the drop in potential from resistance 113 increases. The exciting current in field winding 111 is diminished, and the voltage of the generator increases. A decrease in line voltage brings about the opposite result.

What I claim is:

1. A dynamo electric machine regulating system comprising a dynamo electric machine, an electronic valve arranged in its field circuit to regulate its field excitation, and means to vary the action of said valve in substantial coincidence and accordance with variations in the condition to be regulated.

2. A generator regulating system comprising a generator, an electronic valve arranged in its field circuit to regulate its field excitation, and means to vary the action of said valve in substantial coincidence and accordance with variations in the generator voltage, said means comprising an auxiliary anode for said valve and a circuit for said auxiliary anode rendering said valve effective to make its own measurement of variations in the generator voltage.

3. A generator regulating system comprising a generator, an electronic valve arranged in its field circuit to regulate its field excitation and having an auxiliary anode, and a circuit for said auxiliary anode supplied by said generator and including a bias battery to vary the auxiliary anode voltage in substantial coincidence and accordance with variations in the generator voltage.

4. A generator regulating system comprising a generator, an electronic valve arranged in its field circuit to regulate its field excitation and having an auxiliary anode, means to vary the auxiliary anode voltage in substantial coincidence and accordance with variations in the generator voltage, and means to amplify variations in the auxiliary anode voltage.

5. A generator regulating system comprising a generator, an electronic valve arranged in its field circuit to regulate its field excitation and having a heated cathode and an auxiliary anode, means to vary the auxiliary anode voltage in substantial coincidence and accordance with variations in the generator voltage, and means to amplify variations in the auxiliary anode voltage.

6. A dynamo electric machine regulating system comprising a dynamo electric machine, an electronic valve arranged in its field circuit to regulate its field excitation and having an auxiliary anode to control its action, and means to vary the auxiliary anode voltage in substantial coincidence and accordance with variations in the condition to be regulated.

7. A dynamo electric machine regulating system comprising a dynamo electric machine, an electronic valve arranged in its field circuit to regulate its field excitation and having an auxiliary anode to control its action, means to vary the auxiliary anode voltage in substantial coincidence and accordance with variations in the condition to be regulated, and means to amplify said variations in the auxiliary anode voltage.

8. An alternating current generator regulating system comprising an alternating current generator, electronic means arranged in its field circuit to regulate its field excitation and rectify the generator alternating current, and means to vary the action of said electronic means in substantial coincidence and accordance with variations in the generator voltage.

9. An alternating current generator regulating system comprising an alternating current generator, electronic means arranged in its field circuit to regulate its field excitation and rectify the field current, a transformer to connect the field circuit to said generator, and means to vary the action of said electronic means in substantial coincidence and accordance with variations in the generator voltage.

10. An alternating current generator regulating system comprising an alternating current generator, electronic means arranged in its field circuit to regulate its field excitation and rectify the field current, an impedance to connect the field circuit to said generator, and means to vary the action of said electronic means in substantial coincidence and accordance with variations in the generator voltage.

11. Regulating apparatus for a dynamo electric machine comprising an electronic valve, means to connect said valve in the field circuit to regulate the field excitation, and means to vary the action of said valve in substantial coincidence and accordance with variations in the condition to be regulated.

12. Regulating apparatus for a generator comprising an electronic valve, means to connect said valve in the field circuit to regulate the field excitation, and means to vary the action of said valve in substantial coincidence and accordance with variations in the generator voltage, said means comprising an auxiliary anode for said valve connected to said generator and a bias battery in circuit with said auxiliary anode.

13. In combination, an electric machine having an exciting winding, a vacuum tube of the unidirectional type having an anode and a filamentary cathode between which space current is adapted to flow, connections between said winding and said anode and cathode whereby the current through said winding is simultaneously changed when changes occur in said space current, said vacuum tube having also an auxiliary anode and being responsive to fluctuations in a characteristic of said machine for reducing said fluctuations to a low value, said auxiliary anode having a circuit whereby said tube is rendered effective to make its own measurement of said fluctuations.

14. In combination an electric machine having an exciting winding, main circuit leads for said machine, a vacuum tube regulator of the unidirectional type having an anode, an auxiliary anode and a filamentary cathode, said winding, said anode and said cathode being connected in shunt to said leads, and a circuit for said auxiliary anode rendering said tube effective to make its own measurement of variations in a characteristic of said leads and responsive for holding substantially constant a characteristic of said leads through the intermediary of changes in the space current between said anode and said cathode.

15. In a regulator system, a dynamo electric machine having a regulating field magnet winding, means comprising a substantially pure electron space discharge device having an anode and a cathode connected in circuit with said field winding and a grid element, and a circuit for said grid element to control the latter according to a characteristic of the machine to govern the machine excitation by said device and maintain the machine characteristic constant, said circuit including a bias battery and rendering said discharge device effective to make its own measurement of variations in said machine characteristic.

16. In a regulator system, a direct current dynamo electric machine having a regulating field magnet winding, a space discharge device having a cathode and an anode connected in circuit with said field winding to the machine circuit and a grid element, and a circuit for said grid element to control the latter according to a characteristic of the machine to govern the current flow through the device and said field winding and maintain the machine characteristic constant, said circuit rendering said discharge device effective to make its own measurement of variations in said machine characteristic.

17. In a regulator system, a dynamo electric machine having a regulating field magnet winding, means comprising an electric space discharge device having an anode and a cathode connected in circuit with said field winding and a grid element, and a circuit for said grid element to control the latter according to a characteristic of the machine to exert a continuous regulating action upon the machine of a magnitude at any instant dependent upon the instantaneous potential of the grid element whereby said device serves to maintain the machine characteristic substantially constant, said circuit including a bias battery and rendering said discharge device effective to make its own measurement of variations in said machine characteristic.

18. In combination, an electric machine having an exciting winding, a vacuum tube of the unidirectional type having an anode and a filamentary cathode between which space current is adapted to flow, connections between said winding and said anode and cathode whereby the current through said winding is simultaneously changed when changes occur in said space current, said vacuum tube being responsive to fluctuations in a characteristic of said machine for reducing said fluctuations to a low value, and said tube having a circuit whereby the tube makes its own measurement of said fluctuations.

In witness whereof, I have hereunto subscribed my name.

FRIEDRICH WILHELM MEYER.